United States Patent
Meaney et al.

[11] Patent Number: 6,038,626
[45] Date of Patent: *Mar. 14, 2000

[54] METHOD FOR CONTROLLING DATA TRANSFERS AND ROUTING

[75] Inventors: Patrick James Meaney, Poughkeepsie; Frank Malgioglio, Hopewell Junction, both of N.Y.

[73] Assignee: International Business Machines Corporation, Armonk, N.Y.

[ * ] Notice: This patent is subject to a terminal disclaimer.

[21] Appl. No.: 09/042,971

[22] Filed: Mar. 17, 1998

[51] Int. Cl.[7] .......................... G06F 13/00; G06F 13/40; G06F 17/60; G06F 11/00

[52] U.S. Cl. .................. 710/104; 710/131; 710/126; 709/218; 709/250; 714/5

[58] Field of Search ................................. 710/131, 126, 710/104; 709/218, 250; 714/5; 370/351, 357, 364, 388, 360; 340/825.03

[56] References Cited

U.S. PATENT DOCUMENTS

| | | |
|---|---|---|
| 4,926,386 | 5/1990 | Park . |
| 5,109,332 | 4/1992 | Culley . |
| 5,113,390 | 5/1992 | Hayashi et al. .................... 370/352 |
| 5,212,785 | 5/1993 | Powers et al. . |
| 5,396,638 | 3/1995 | Kanekura ............................ 712/201 |
| 5,717,948 | 2/1998 | Michalina .......................... 710/1 |
| 5,764,895 | 6/1988 | Chung ............................. 709/250 |
| 5,875,470 | 2/1999 | Dreibelbis et al. ................. 711/147 |

OTHER PUBLICATIONS

"Floating–Point Performance Model For A Risc–Based System" IBM Technical Disclosure Bulletin, by T.B. Genduso et al., vol. 31, No. 12, May 1989, pp. 425–429.

*Primary Examiner*—Ayaz R. Sheikh
*Assistant Examiner*—Tim Vo
*Attorney, Agent, or Firm*—Lynn L. Augspurger

[57] ABSTRACT

A scalable selector and method for a data processing system provides a multiple-bit, multiple bus selector logic for controling data routing and allowing dataflow to be connected and reconnected without change to control logic. The scalable selector logic includes a data selector controlled by the input controls as could accommodate controls from the Prior Art, as well providing an additional Orthogonality Checker to monitor for the condition where more than one control signal is active, and additional Data Valid logic to determine whether any of the input data buses has been selected to the output. The scalable selectors can be used in a switching network where these additional outputs operate as network controls allowing for the selection of buses in a switch network with orthogonality checking and data valid generation. The selectors also allow for swapping of data ports for timing and function sharing without impacting existing external control logic.

13 Claims, 2 Drawing Sheets

METHOD FOR CONTROLLING DATA TRANSFERS AND ROUTING

CROSS REFERENCE TO RELATED APPLICATION

The present application related to the following co-pending patent applications which is being filed concurrently herewith by the inventors hereto entitled:

"Scalable, Modular Selector System", filed Mar. 17, 1998 and assigned U.S. Ser. No. 09/042,977.

These co-pending application and the present application are owned by one and the same assignee, International Business Machines Corporation of Armonk, N.Y.

FIELD OF THE INVENTION

This invention is related to data processing system such as computers, control systems, and communications and in particular, to a scalable selector system, apparatus and method for controlling data transfers and routing in a data processing system, such as an SMP computer system.

BACKGROUND OF THE INVENTION

In such a data processing system as an SMP computer system, a control unit is generally used for controlling data transfers and routing. The control unit connects to the dataflow. The data routing is often implemented using Multiplexors (MUX) or Selector logic with encoded controls. There is often no checking on the control signals to determine if data is properly steered through the selection logic. Also, as new buses or controls are added, the dataflow has to be re-worked. All this is troublesome.

SUMMARY OF THE INVENTION

Our invention provides for general use in data processing systems a method for controlling data transfers and routing using a set of selectors combined with orthogonality checkers and OR logic in the processing system connected to the dataflow and control logic for controling data routing logic to allow dataflow to be connected and reconnected without change to control logic. Also, the checking is scalable such that only a few ports have to be re-worked for design changes. It is also very easy to swap ports and restructure the design without having to change codepoints.

The improvements which we have made allows for swapping of any ports as long as data and control are swapped together. Timing is improved and there is not any need for decodes on MUX controls. Orthogonality checking is achieved, and the checking is scalable and keeps existing structures for checking.

These improvements are accomplished by providing, within a a multiple-bit, multiple bus selector logic for providing a data selector controlled by the input controls as could accommodate controls from the Prior Art, as well providing an additional Orthogonality Checker to monitor for the condition where more than one control signal is active, and additional Data Valid logic to determine whether any of the input data buses has been selected to the output.

In addition, we can connect the scalable selectors by providing these additional outputs in a scalable switching network and operate the network by controls as we will describe.

These and other improvements are set forth in the following detailed description. For a better understanding of the invention with advantages and features, refer to the description and to the drawings.

DETAILED DESCRIPTION OF THE INVENTION

Before considering our preferred embodiments in detail, it may be worthwhile to illustrate, by way of example, how the prior art selector would be built.

Figure 2:
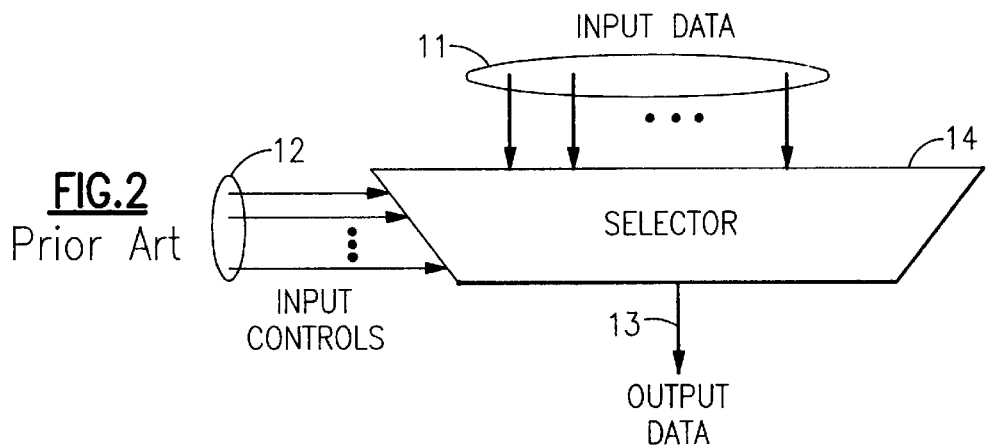
In FIG. 2 we show an example of how we can use input controls as provided in available prior art.

Turning now to FIG. 2, we show an example of how we can use input controls as provided in available prior art. A multiplicity of input data buses, 11, is connected to selector logic, 14, which is controlled by input controls, 12, to produce single output data bus, 13. Said input controls, 12, may be implemented as decoded gate signals, shown, or encoded multiplexor controls (in which case the selector logic shown, 14, would be a multiplexor).

If more than one input control is active, 12, the output, 13, will be the logical OR of all selected input data buses. Notice that if more than one control input, 12, is active (because of a defect or control error), this corruption of data in the network may go undetected under certain conditions.

Figure 3:
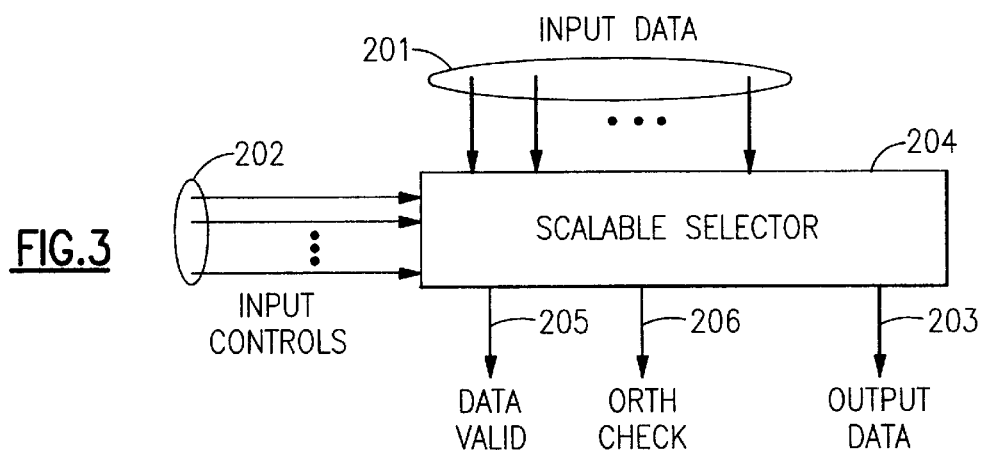
FIG. 3 illustrates the basic selector organization of of the invention.

Turning now to our invention in greater detail, it will be seen from FIG. 3 which illustrates the basic selector organization of of the invention.

As shown in FIG. 3 a multiplicity of input data buses, 201, is connected to the scalable selector, 204, which is controlled by input controls, 202, to produce single output data bus, 203, as well as data valid signal, 205, and orthogonality check signal, 206.

Figure 4:
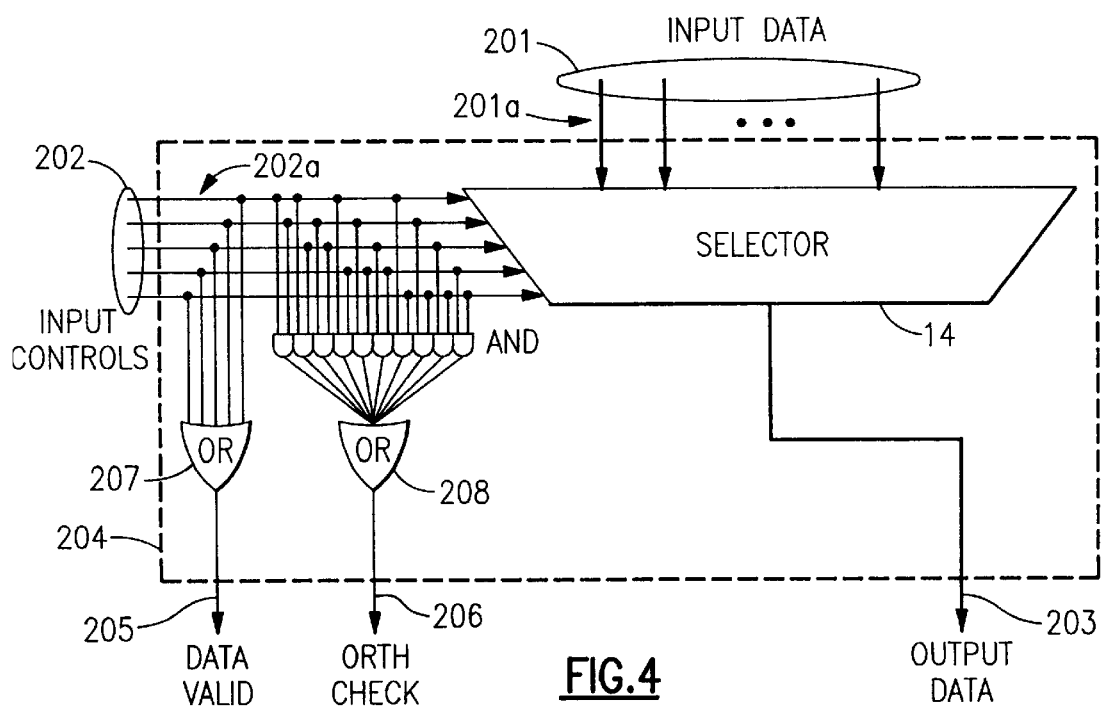
FIG. 4 shows a scalable selector in more detail.

FIG. 4 shows the scalable selector, 204, in more detail. Input data buses, 201, connect to input data ports of the prior art selector, 14, and are selected to output, 203, by input controls, 202.

In addition, input controls, 202, are also connected to OR logic, 207. Output of said OR logic, 207, connects to output data valid, 205, which is active if any of the input select controls, 202, are active.

Further, input controls, 202, are also connected to AND-OR logic, 208, such that ALL possible pairs of input control bits, 202, feed a different 2-input AND of the AND-OR logic. Outputs of all the 2-input AND circuits are ORed together as part of the AND-OR logic, 208. Output of said AND-OR logic, 208, is connected to output orthogonality checker, 206.

Figure 1:
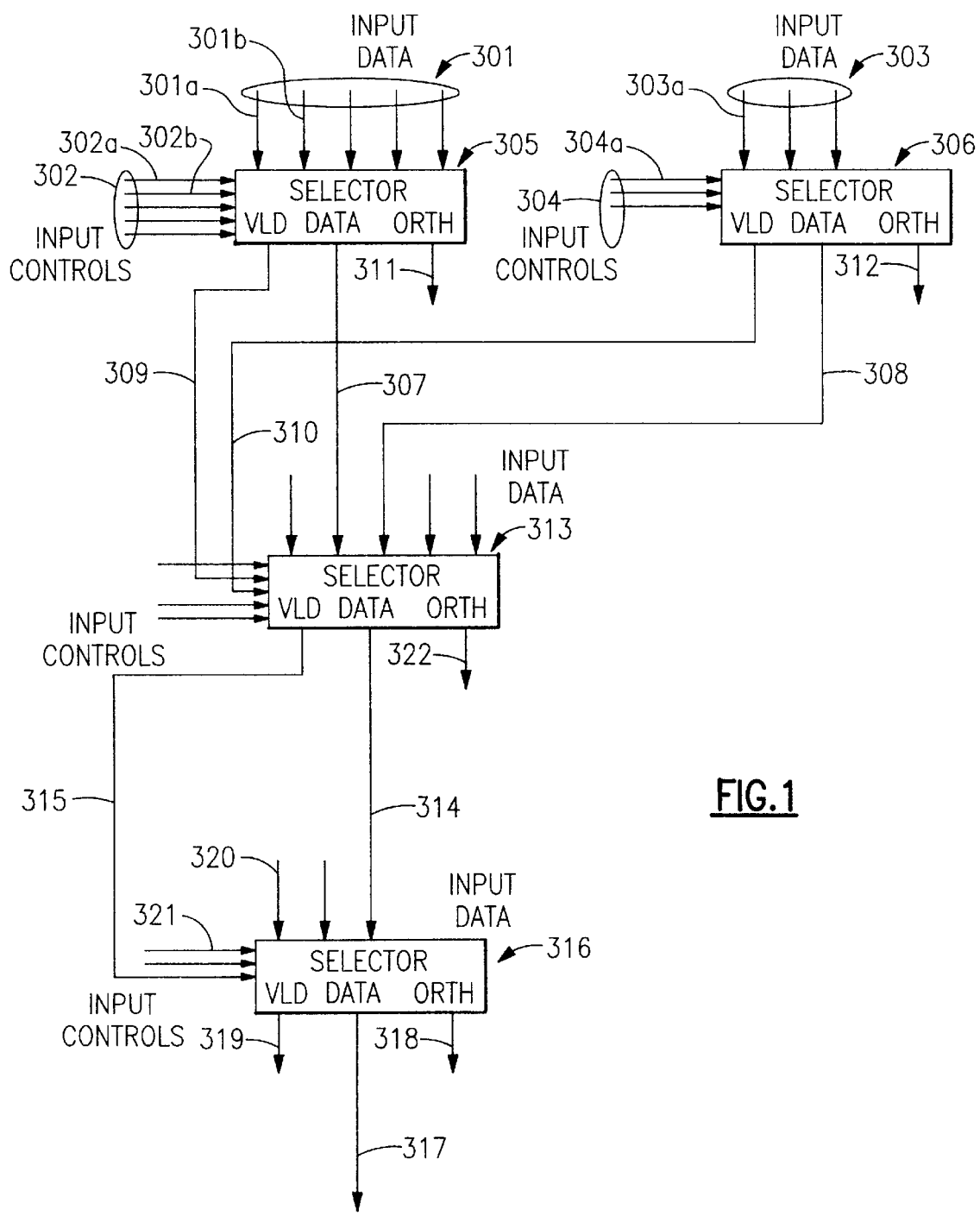
FIG. 1 shows schematically an overview of the preferred embodiment and particularly shows a Scalable Selector, 305, 306, 313, and 316, used in a switch network.

FIG. 1 shows schematically an overview of the preferred embodiment and particularly shows a Scalable Selector, 305, 306, 313, and 316, used in a switch network.

Each selector selects up to one input bus to propagate to the output data bus. In addition, if an input data bus is chosen, the data valid output of that selector becomes active. The data valid signal is then used to force the selected data to propagate through the remaining network, without the need for additional intervention in the controls for later stages.

Also, in our preferred embodiment we provide a method for performing orthogonality checking at each scalable selector to ensure that one or less inputs were selected. In the event that two or more inputs were selected by ANY selector in the network, one of the orthogonality checker signals will become active, indicating an error.

It can be appreciated that in accordance with our improved process any data input is always paired with a corresponding control input. That data input and control can be moved or swapped with any other pair without changing the overall switch function. This can be done to improve timing without having to alter the design substantially. For example, if data input bus, 303a, or control input, 304a, arrive late to the network, they can be swapped with data bus, 320, and control input, 321, respectively. Thus, inputs 320 and 321 can be connected to selector, 306, and inputs 303 and 304 can be connected to selector, 316. This swapping of data/control ports can be done anywhere within the switch network. This allows for design changes without changes to the control logic that feeds the switch controls.

In addition to timing improvements, data and control inputs can also be organized in accordance with our preferred embodiment to improve sharing of function. For instance, output bus, 317, is the result of selecting one of 13 input buses. Assume that another function needs to use bus 308. Organizing input data buses, 303, together helps to accomplish this function without having to replicate the logic again for the other purpose.

Thus, it will be seen with respect to FIG. 1 that our system provides a multiplicity of input data buses, 301, connects to scalable selector, 305, and is controlled by a multiplicity of input control bits, 302, which are used to select which input data bus becomes available on output data bus, 307. Data valid output of scalable selector, 305, is connected to control signal, 309. Orthogonality checker output of scalable selector, 305, is connected to control signal, 311.

Also, a multiplicity of input data buses, 303, connects to scalable selector, 306, and is controlled by a multiplicity of input control bits, 304, which are used to select which input data bus becomes available on output data bus, 308. Data valid output of scalable selector, 306, is connected to control signal, 310. Orthogonality checker output of scalable selector, 306, is connected to control signal, 312.

Looking at the next stage of the switch network, data bus, 307, and data bus, 308, are connected to input data ports of scalable selector, 313. Control signals, 309 and 310, are connected to input control ports of scalable selector, 313, corresponding to data input buses, 307 and 308. Data output of scalable selector, 313, is connected to data bus, 314, and output data valid of selector, 313, is connected to control signal, 315. Orthogonality checker output of scalable selector, 313, is connected to signal, 322.

Looking at the final stage of the switch network, data bus, 314 is connected to an input data port of scalable selector, 316. Control signal, 315, is connected to an input control port of scalable selector, 316, corresponding to data input bus, 314. Data output of scalable selector, 316, is connected to data bus, 317, and output data valid of selector, 316, is connected to control signal, 319.

We will next illustrate the case where ZERO control signals are active. By use of example in FIG. 1, it can be seen that if ALL the input controls to ALL stages of the switch network are inactive, (ie. zero), none of the input data buses will be selected onto buses, 307, 308, 314, or 317. Therefore, the output of the network will be a bus of all zeros. All the data valid signals, 309, 310, 315, 319, will be zero. all zeros. All the orthogonality checks, 309, 310, 315, 319, will be zero.

We will next illustrate the case where ONE control signal is active. By use of example in FIG. 1, it can be seen that if only ONE input control signal, (eg. 304a), is active, the corresponding data bus, 303a, will be transferred to bus, 308. The data valid, 310, will be active, causing selector, 313, to transfer value of bus 308, onto bus 314. The data valid, 315, will be active, causing selector, 316, to transfer value of bus, 314, onto bus, 317, thus the value of 303a is transferred to the output bus, 317. The data valid, 319 will be active. No other data valids are active and no orthogonality checkers come up.

We will next illustrate the case where TWO LOCAL control signals are active. By use of example in FIG. 1, it can be seen that if only both input control signals, 302a and 302b, are active, the corresponding data buses, 301a and 301b, will be ORed together and transferred to bus, 307. Since two control inputs, 302a and 302b, are active, Orthogonality checker, 311, will be active, indicating an error. The data valid, 309, will be active, causing selector, 313, to transfer value of bus 307, onto bus 314. The data valid, 315, will be active, causing selector, 316, to transfer value of bus, 314, onto bus, 317, thus the bit OR of buses 302a and 302b is transferred to the output bus, 317. Since two buses were selected, the output does not necessarily match input buses 302a or 302b. Therefore, the error condition on signal 311 should be used to invalidate the output data, 317, even though output data valid, 319 is on.

We will next illustrate the case where TWO REMOTE control signals are active. By use of example in FIG. 1, it can be seen that if only both input control signals, 302a and 304a, are active, the corresponding data buses, 301a and 303a, will be transferred to buses, 307 and 308, respectively. Neither orthogonality checker, 311, nor 312 will be active. Both data valid signals, 309, and 310 will be active, causing selector, 313, to transfer the OR of buses, 307 and 308, onto bus 314. Since two control inputs, 309 and 310, are active, orthogonality checker, 322, will be active, indicating an error. The data valid, 315, will be active, causing selector, 316, to transfer value of bus, 314, onto bus, 317, thus the bit OR of buses 302a and 303a is transferred to the output bus, 317. Since two buses were selected, the output does not necessarily match input buses 302a or 303a. Therefore, the error condition on signal 322 should be used to invalidate the output data, 317, even though output data valid, 319 is on.

Although the preferred embodiment does not show the explicit ORing of the orthogonality checkers, someone skilled in the art can perform this OR. Also, the ORing of the checkers can be incorporated in the scalable selector by adding another OR to each of the scalable selectors to propagate the orthogonality checker to the final output stage, similar to data valid.

While implementing the invention, it may become advantageous to replace some of the internal selectors with ORs. For example, if the selector stage, 313, only requires two data inputs, 307 and 308, then the internal prior art selector with control signals, 309 and 310, gating data signals, 307 and 308, onto output bus, 314, could be replaced by a bit-OR of buses 307 and 308 to produce bus 314. The data valid and orthogonality checker would remain as described. This may improve timing and testability at the expense of scalability. This and other improvements are possible.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method of controlling data transfers and routing in a data processing system, comprising the steps of in a scalable selector system comprising a network having a plurality of selector stages, each having:
  (a) a plurality of input data buses coupled to
  (b) a multiple-bit, multiple bus selector having a data, a data valid output, and an orthogonality check output and having multiple data input bus ports coupled for receipt of signal from said plurality of input data buses, and
  for controlling data transfers and routing by said network and controling data routing logic to allow dataflow to be connected and reconnected without change to control logic by:
  selecting with said selector up to one input bus to propagate to the output data bus, and
  if an input data bus is chosen, treating the data valid output of that selector as becoming active, and using the data valid signal to force selected data to propagate throughout the network, without the need for additional intervention in the controls for later stages.

2. A method of controlling data transfers and routing according to claim 1,
  wherein a multiplicity of said input data buses provide input controls to said multiple-bit, multiple bus selector to produce a single output data bus signal on a data output bus, and a data valid signal as a control output, and an orthogonality check signal.

3. A method of controlling data transfers and routing according to claim 1, wherein a plurality of said selectors combine orthogonality checkers and OR logic in the processing system which is connected to the data processing system's dataflow and control logic for reconnecting the dataflow without changes to the control logic.

4. A method of controlling data transfers and routing according to claim 1, wherein each scalable selector allows for swapping of any ports as long as data and control are swapped together for swapping of data ports for timing and function sharing without impacting existing external control logic of said data processing system.

5. A method of controlling data transfers and routing according to claim 1, wherein said steps include performing orthogonality checking at each scalable selector to ensure that one or less inputs were selected, and in the event that two or more inputs were selected by ANY selector in the network, one of the orthogonality checker signals will become active, indicating an error.

6. A method of controlling data transfers and routing according to claim 4, wherein said steps include pairing any data input with a corresponding control input such that data input and control can be moved or swapped with any other pair without changing the overall switch function.

7. A method of controlling data transfers and routing according to claim 4, wherein said steps include when data or control signals arrive late to the network, they can be swapped control input, 304a, arrive late to the network, they can be swapped with data bus and control input, respectively, such that inputs can be connected to differing selectors of the network for swapping of data and control ports anywhere in the network to all design changes without changes to the control logic that feeds the network's switch controls.

8. A method of controlling data transfers and routing according to claim 4, wherein data or control inputs are organized by selecting one of a multiplicity of input buses to improve sharing of function, so that when a specific function needs to use a bus, the bus function can be organized to improve sharing of function by selecting a specific input bus to select an output bus without having to replicate the logic again for the other purpose.

9. A method of controlling data transfers and routing according to claim 4, including changing ALL the input controls to ALL stages of the switch network to inactive, and when ZERO control signals are active, none of the input data buses will be selected onto buses, and the output of the network will be a bus of all zeros and all the data valid signals will be zero and all the orthogonality checks will be zero.

10. A method of controlling data transfers and routing according to claim 4, including changing ONE control signal to active and when only ONE input control signal is active, the corresponding data bus is will be transferred to a different bus, and the data valid signal will be active, causing the associated generating selector to transfer the value of value of its input bus onto its output bus and causing a data valid signal to be active causes a receiving selector to transfer a value of its input bus into its output bus, whereby an initial input of said network of selectors input bus will have its value transferred to the output bus of the network and the output selectors data valid signal to be be active.

11. A method of controlling data transfers and routing according to claim 4, including changing two LOCAL control signals to active causes an error condition signal to invalidate the output data of the network stage even though an output data validity signal is on.

12. A method of controlling data transfers and routing according to claim 4, including changing input control signals to active causes the corresponding data buses to be will be ORed together and transferred out to a next stage of the networks, but since two control inputs are active, orthogonality checking turns active, indicating an error, and indicating the error error condition by an orthogonality signal to invalidate the output data, even though an output data valid signal is on.

13. A method of controlling data transfers and routing according to claim 4, wherein selecting two input buses for a selection provides an output of two buses that does not necessarily match input buses of the network, and in such circumstance the system uses an error condition signal to invalidate the output data, even though an output data valid signal on.

* * * * *